United States Patent [19]

Bougon

[11] 4,107,854

[45] Aug. 22, 1978

[54] TRAINING SYSTEM FOR SIMULATING AN ANIMATED SCENE

[75] Inventor: Pierre Paul André Bougon, Elancourt, France

[73] Assignee: Le Materiel Telephonique, Boulogne-Billancourt, France

[21] Appl. No.: 788,783

[22] Filed: Apr. 19, 1977

[30] Foreign Application Priority Data

Apr. 23, 1976 [FR] France ................... 7612043

[51] Int. Cl.² ............................................. G09B 9/00
[52] U.S. Cl. ................................... 35/25; 35/11 A; 358/104
[58] Field of Search .................. 35/10.2, 11 A, 12 N, 35/25; 358/104

[56] References Cited

U.S. PATENT DOCUMENTS

| | | | |
|---|---|---|---|
| 3,131,487 | 5/1964 | Lyon et al. | 35/12 N |
| 3,234,665 | 2/1966 | Sear et al. | 35/12 N X |
| 3,504,122 | 3/1970 | Ratliff | 35/25 X |
| 3,522,667 | 8/1970 | Guillenschmidt et al. | 35/25 |
| 3,560,644 | 2/1971 | Petrocelli et al. | 35/11 A X |
| 3,600,510 | 8/1971 | Owen et al. | 35/11 A X |
| 3,603,726 | 9/1971 | Garber et al. | 35/12 N X |
| 3,621,131 | 11/1971 | Wolff | 35/11 A X |
| 3,862,358 | 1/1975 | Wolff | 35/11 A X |
| 3,932,702 | 1/1976 | Shelley et al. | 35/12 N X |
| 4,001,499 | 1/1977 | Dowell | 35/12 N X |

Primary Examiner—Vance Y. Hum
Attorney, Agent, or Firm—Roland Plottel

[57] ABSTRACT

A system for simulating an animated scene useful, for example, in training personnel to dock large supertankers, fire modern weapons, etc. The system uses a pair of identical background transparencies, one of which is used to generate an animation zone including an electronically inlayed image of a moving object. The animation zone is then optically superimposed on the other transparency.

4 Claims, 2 Drawing Figures

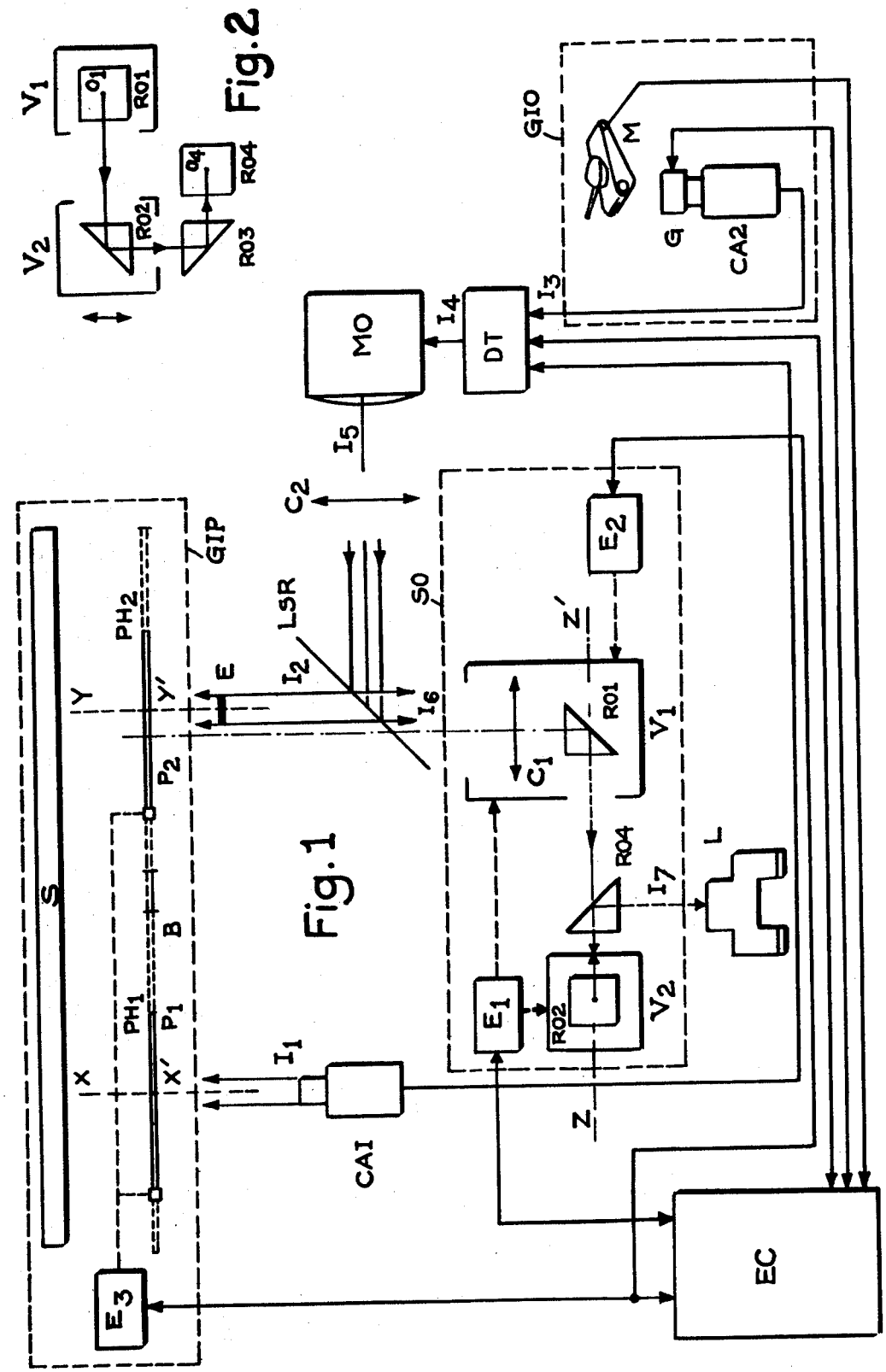

TRAINING SYSTEM FOR SIMULATING AN ANIMATED SCENE

BACKGROUND OF THE INVENTION

1. a. Field of the Invention

The present invention relates generally to the simulation of animated scenes showing an object moving in a given environment.

2. Discussion of the Prior Art

By associating optical means with electrical image inlaying and processing means, the present invention offers a new improved solution to the problems of simulation raised, for example, by weapons firing and ship control training systems.

In particular, a first illustrative embodiment of the invention discloses a weapons firing training system which simulates in a viewfinder the image of a landscape containing a moving target (e.g. a battle tank, vehicle or the like), which trainees using the system are expected to detect and against which they should open simulated fire.

The simulation of animated-scenes showing a background, such as a landscape, containing a moving object is a difficult problem when the landscape image is large and is required to possess high definition.

The problem of inserting the image of a moving object into another image can only be partially solved by the use of electro-optic converters as the visual systems in use today produce images which are too small to be practical.

A simulation system in which the image of a moving object is inserted electronically into an intermediate image which is itself optically superimposed on a larger image, is the subject of French Pat. No. 2,280,943.

It has been shown that in the region to be simulated, in which an observer searches for or closely examines an object in a landscape, the relatively small area surrounding the object (which corresponds in fact to the zone of vision in which the human eye is capable of concentrating its attention) plays a special part in the simulation. The definition of the image of this zone, which typically is "processed" to display the object, should be as good as, if not better than, that of the landscape image.

The landscape image can, of course, be obtained by means of photographs, the present-day definition of which is excellent. On the other hand, the definition of images obtained by the use of simulated visual display screens is still limited.

SUMMARY OF THE INVENTION

As a solution to these and other problems, we have devised the novel process disclosed and claimed herein. This novel process, which comprises inserting into a photographic image the image produced by a visual display screen, thus results in a final animated image which, due to the resolving power of the eye, is completely satisfactory provided that the inserted image subtends a relatively small angle. Such a process is particularly suitable for application to a training simulation system for weapons firing.

In this system, the landscape is divided into an animated area and an environmental area. The animated area includes those parts of the landscape which are in close proximity to the object constituting the target. The action of the simulated operation is formed exclusively within this area. In particular, optical effects, such as smoke-shell-bursts and, in the case of flat-trajectory weapons, the projectile flight-paths can be introduced into this area.

The larger environmental area surrounds the animated area and comprises the remainder of the landscape in which no activity occurs at the time considered. This landscape provides the extended field of view necessary for surveillance exercises and also contributes to the realism of the simulated operation.

The object can change configuration within the animated area but by design is capable of only limited movement within the actual animated area. On the other hand, movement any where within the landscape is obtained by moving the animated area itself, since the position of this area and the object are related.

During such movement, the parts of the landscape which are on the boundary of the animated area pass through the latter in a continuous manner from the environmental area to the animated area or vice-versa.

In the present text, the terms "animated" and "animation" are meant to convey the idea of life and movement as opposed to stationary objects which [that which is inert], are immobile but are not intended to apply to the idea of displacement or changing location.

An animated image is, thus, an image which may or may not be moving at any given moment of time, but which is essentially an "animated" object capable of changing its attitude or configuration at will.

The system described in the co-pending patent application mentioned above provides the following "features":

- an intermediate image of the animated area obtained from a transparent photographic landscape slide and a television camera;
- an environmental image formed by optical means from said photograph, which image is similar to the landscape image but which possesses a zero-brightness area formed by an opaque screen whose external contour and position correspond to those of the animated area;
- an object image;
- an animated image of the animation area obtained by means of an electronic processing circuit and a television monitor which inserts the object image into the animation zone image; and
- a final animated landscape image obtained by the optical addition of the animated image and the environmental image, this addition being performed in registration with the zero-brightness area.

In this system, the object is moved across the landscape by moving the camera, screen and monitor with respect to the photograph.

The present invention partly adopts the principles utilized in the earlier system above described.

A first feature of the system according to the invention is the inclusion of first and second photographic landscape transparencies to each of which is transmitted a movement in its plane, similar but of opposite direction to the apparent motion of the real object with respect to the observer.

A second feature of the instant invention is that the animation area is obtained from a first transparency whilst the environmental image is obtained from a second transparency.

A third characteristic of the invention is that the final image of the animated landscape is obtained by the use of an optical compensation device which views an intermediate animated landscape image, the movement of which is similar to that of the transparencies, the movement of an object in the landscape being obtained by moving the photographs (the camera, screen and monitor being fixed).

DESCRIPTION OF THE DRAWING

The system according to the invention is illustrated by means of a single drawing containing two figures:

FIG. 1 is a partially schematic, partially diagrammatic view of the overall system, whilst FIG. 2 depicts the optical compensation device in more detail.

DETAILED DESCRIPTION OF THE INVENTION

The system according to the invention includes the following elements:
- a landscape image generator GIP;
- an electro-optic image converter CA1
- an opaque screen E
- a semi-transparent mirror LSR
- an image converter MO
- an electronic processing device DT
- an object image generator GIO
- an optical compensation system SO
- a control system EC; and
- a fixed viewfinder L which can be oriented in the field of observation.

These elements will be discussed in greater detail below.

It is obvious that various conventional optical systems for focusing or inverting images need not be specifically shown. As shown in FIG. 1, the landscape image generator GIP comprises two identical photographic transparencies PH1 and PH2 showing a landscape whose component parts can be identified by reference to two orthogonal reference axes, and a carriage B, capable of moving each of the photographs with respect to two orthogonal axes, but which maintains constant photograph spacing and orients the photographs such that their reference axes remain parallel to the translation axes.

In FIG. 1, the example is arranged such that the translation axes in elevation and bearing are oriented vertically and horizontally respectively. As shown, an actuator mechanism E3, when ordered by the control system EC, generates two components of displacement to each of two photographs PH1 and PH2 along the translation axes, such that each photograph is moved by an amount equal and opposite to the real displacement of the object in the landscape, the displacement of each photograph being defined from a fixed axis XX' or YY', perpendicular to the translation plane and passing through the average location of the centre of this photograph. The system further comprises a light source S respectively producing from the two photographic transparencies a first landscape image P1 and a second landscape image P2 each of the required brightness.

The system also includes an object image generator GIO comprising a television camera CA2, fitted with a variable optical magnification device G, a model M, simulating the target object, the movements of which are determined by the control system EC. This generator may optinally be replaced by either a video recorder or a digital system in which the object image is stored in digital form on magnetic tape, or again by a motion picture - TV camera system.

The system further includes an optical compensation system SO comprising four optical reflecting devices RO1, RO2, RO3 and RO4, such as prisms or mirrors. The projection of these four devices onto a vertical plane passing through axes ZZ' is shown in FIG. 2.

These devices are assembled in a conventional manner to produce in the viewfinder L an image I7 from the moving image I6 obtained from the semi-transparent mirror LSR.

Optical devices RO1 and RO2 are mechanically fixed with respect to a pair of moveable carriers V1 and V2 respectively. A pair of actuators E1 and E2 impose on carrier V1 motion along two axes which is identical in elevation and bearing with the motion of the photograph PH2 such that the optical axis of compensation system SO passes constantly through the centre of image I6.

Actuator E1 also imposes on carrier V2 movement along the elevation axis which is identical with that imposed on carrier V1, such that the optical device RO2 constantly reflects the image incident on it from device RO1 to the fixed reflecting device RO3.

In operation, the optical axis of an image converter CA1, e.g. a television camera, is arranged to be coincident with the mean axis XX' of landscape photograph PH1. Converter CA1 views on the first landscape image, the photographic elements which are to be located in the animation zone. The contour of this zone is, of course, determined by the focal length of the lens associated with converter CA1.

The movement of photograph PH1 results in the relative movement of the animation zone in this first landscape image. Converter CA1 feeds an animation zone image I1 at video frequency to a video processing device DT. At the same time the object image generator GIO feeds an object image I3 on a black background at video frequency to the processing device DT.

By conventional electronic means, processing device DT inserts the object image into the video signal for the animation zone at a position determined by the control system EC, those parts of the landscape normally hidden from the observer by the object being eliminated.

Processing Device DT thus feeds an animated image I4 of the animation zone in electronic form to an image converter MO comprising, for example, a conventional television monitor. The converter MO then produces an animated image I5 of the animation zone. An opaque screen E, or similar outline to that of the animation zone, is positioned opposite the second landscape image PH2 in alignment with the mean axis of this second image in order to intercept part of the image therefrom and form an environmental image I2, similar to the second landscape image, but possessing a zero-brightness zone whose outline is similar in shape and position in this environmental image to the outline of the animation zone in the first landscape image.

The animated image I5 of the animation zone is optically added to the environmental image I2 by means of a semi-transparent mirror LSR, such that it coincides with the zero-brightness area, forming a moving, animated landscape image I6 similar to the required animated landscape image, but which makes movements in its plane which are identical to those of the second landscape image.

The light rays comprising image I6 are intercepted by the optical compensation device SO which produces an image I7, similar to image I6, but which is fixed with respect to the observer's viewfinder L. This image is focused to infinity by a pair of collimation devices C1 and C2.

The control system EC co-ordinates the operation of the various elements comprising the above described system either automatically or under the control of an instructor responsible for the weapons training exercise.

This system generates amongst a number of electrical signals those defining the attitude, movement and distance of an object in the landscape.

It also feeds the necessary signals to the object image generator, processing device, optical compensation system and landscape image generator.

Although the principles of the present invention are described above with reference to a specific practical example, if should be clearly understood that said description is given as an example only and does not limit the scope of the invention.

I claim:

1. An animated scene simulation system of the type wherein the image of an object is inserted electronically into an animation zone image which, in turn, is added optically into a landscape image, which comprises:
   means for generating first and second substantially similar landscape images;
   means for inducing displacements of said images in their respective planes, each of these displacements being defined with respect to a given fixed mean axis perpendicular to the translation plane of the corresponding image;
   an image converter, the optical axis of which is coincident with the means axis of the first landscape image and which produces an image of the animation zone;
   an opaque screen the outline of which is similar to that of said animation zone and which is positioned opposite the second landscape image in registration with the mean axis of said second landscape image thereby to form an environmental image similar to the second landscape image but possessing a zero-brightness zone similar in outline and position in said environmental image to the animation zone in the first landscape image;
   means for producing an animated object image in electronic form;
   a processing device for electronically inserting the object image into the animation zone image thereby to produce in electronic form an animated image of the animation zone;
   an image converter for producing in optical form an animated image of the animation zone;
   means for producing, by the optical addition of the animated image of the animation zone and the environmental image, in correspondence with the zero-brightness zone, a moving image of the animated landscape, the displacement of said moving image being substantially similar to that of the second landscape image;
   an optical compensation device for producing from the moving animated landscape image an animated landscape image observable in a viewfinder fixed with respect to an observer; and
   control means for coordinating the operation of the object producing means, displacement inducing means and moving image producing means.

2. An animated scene simulation system in accordance with claim 1, wherein the landscape image generating means comprises:
   a first photographic transparency representing a landscape, the features in said landscape being defined by reference to two orthogonal reference axes, said transparency producing said first landscape image;
   a second photographic transparency, substantially similar to said first photographic transparency, said second transparency producing said second landscape image; and
   a carriage controlled by said control means, said carriage including means for guiding each of said transparencies along two orthogonal translation axes, while maintaining a fixed spacing there between and for guiding the transparencies such that their reference axes are parallel to the translation axes.

3. The system according to claim 2 wherein said object image producing means comprises a television camera, said image converter comprises a television monitor and said moving image producing means comprises a semitransparent mirror.

4. The system according to claim 2 wherein said optical compensating device comprises: first, second, third and fourth optical prisms, said first prism receiving said moving animated landscape image, and said fourth prism directing said image into said viewfinder.

* * * * *